UNITED STATES PATENT OFFICE.

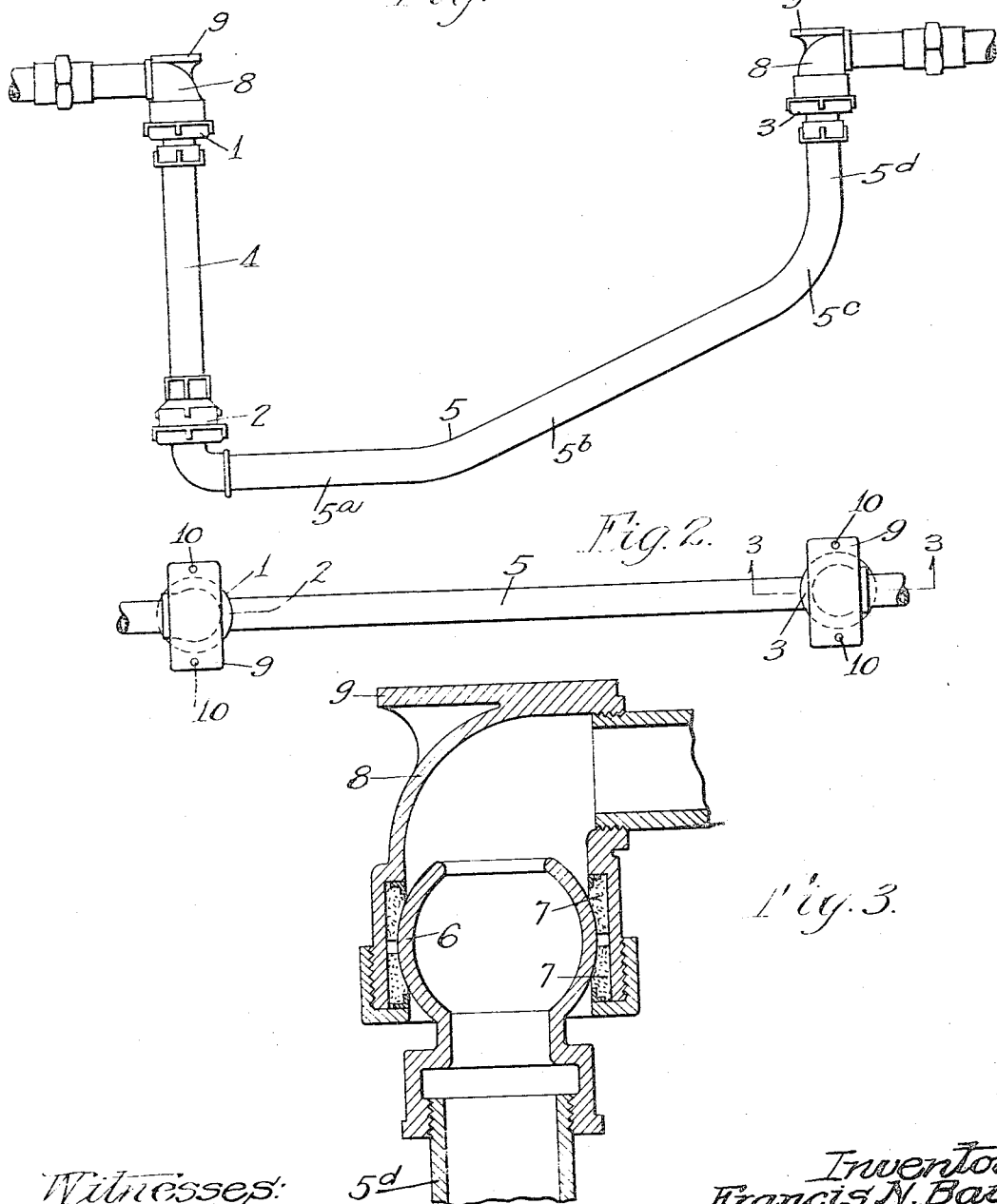

FRANCIS N. BARD, OF HIGHLAND PARK, ILLINOIS.

CONNECTION BETWEEN THE ENGINES AND TENDERS OF TRAINS.

1,278,567.

Specification of Letters Patent. Patented Sept. 10, 1918.

Application filed February 15, 1915. Serial No. 8,204.

*To all whom it may concern:*

Be it known that I, FRANCIS N. BARD, a citizen of the United States, residing at Highland Park, in the county of Cook and State of Illinois, have invented a certain new and useful Improvement in Connections Between the Engines and Tenders of Trains, of which the following is a specification.

This invention relates to connections between the engine and tender of a train, and particularly connections through which steam, air or liquid may pass. The invention is illustrated in the accompanying drawings, wherein—

Figure 1 is a side elevation of a connection embodying the invention;

Fig. 2 is a plan view of the device;

Fig. 3 is a sectional view on line 3—3 of Fig. 2.

Like numerals refer to like parts throughout the several figures.

Connections of this description must be flexible, and in practice there are at least three universal or flexible joints used. In the present construction I have shown a connection provided with three flexible joints 1, 2 and 3. It will be noted that two of these universal joints 1 and 2 are in substantial vertical alinement and are connected together by a pipe 4 which hangs substantially vertical under normal conditions. The flexible joints 2 and 3 are connected together by the connecting piece or pipe 5, which as shown in the drawings is preferably a single piece. When a single piece is used it may be formed or bent in any desired manner. In the preferred form, however, this piece has four different sections, the section 5$^a$, which is substantially horizontal, the section 5$^b$, which is inclined, the section 5$^c$, which is curved, and the section 5$^d$, which is substantially vertical, the part 5$^d$ being in substantial vertical alinement with the flexible joint 3. The ball and socket joints have balls 6 (see Fig. 3) and gaskets 7, and a tight joint is secured by the pressure on the gaskets. It will be noted that in this particular construction all three of the ball and socket joints are in a vertical position, and that the pressure on the gaskets in all of them is therefore evenly distributed, the balls being held in place in contact with their respective opposed faces or gaskets by the weight of the parts and the pressure of the material flowing through the connection. This is an important feature in connections of this kind, particularly where ball and socket joints are used. In the connections as now made, the third or intermediate flexible joint is placed on its side, and hence the wear on the gasket is at one side, thereby greatly reducing the life of the joint and causing leakage. The other two joints, as heretofore made, are often in an inclined position and not vertical, and hence the wear is uneven and the life and effectiveness of the joints decreased.

It will further be noted that the flexible joints 1 and 2 are in substantial vertical alinement, and that a leverage greater than that heretofore attainable, is secured, to move the parts so that they can adjust themselves to the different conditions of the track. This permits the joints to be made tighter, and yet they may be more flexible and more responsive to the movements of the engine and tender. The sections 8 of the joints 1 and 3 which receive the balls, are directly connected to some part of the engine or tender, being provided with flanges 9 for this purpose, said flanges having holes 10 through which bolts or screws or other fastening devices may be passed.

It will further be seen that the flexible joints as it were, are localized at the ends of the connection, thus entirely eliminating the flexible joint in the space intermediate the engine and the tender, and the defects of this construction, and at the same time retaining the advantage of such joint and securing other additional advantages, as herein set out. This construction also eliminates a number of pipe threads which might become unscrewed and break the joint, and the entire construction adds very greatly to the safety and efficiency of the connection.

For purposes of illustration I have shown a single connection, but in practice there will be a plurality of these connections, depending upon the number of connections necessary, the several connections being located side by side.

I have described in detail a particular construction embodying the invention, but it is of course evident that the parts may be varied without departing from the spirit of my invention, and therefore do not limit myself to the particular construction shown.

In the claims I have used the phrase "connecting device" and when so used in these claims I use it in the sense as designating the whole structure. I have also used the phrase "connecting device between the engine and tender of a train" in these claims, but it is of course evident that the device might be used between two engines or two tenders or in any other connection for which the device is suitable, without departing from my invention.

I claim:

1. A connecting device between the engine and tender of a train comprising three ball and socket joints, two of said ball and socket joints being located at the same end of the connecting device, a substantially vertical pipe between said latter two ball and socket joints, said latter two ball and socket joints having their axes in substantial vertical alinement, the third ball and socket joint being located at the other end of the connecting device, a pipe substantially spanning the space between the engine and tender of the train and connecting the lower one of said two flexible ball and socket joints with the third ball and socket joint, said ball and socket joints free to move to automatically adjust the parts in response to relative movement between the engine and tender of the train.

2. A connecting device between the engine and tender of a train comprising three ball and socket joints, two of said ball and socket joints being located at the same end of the connecting device, a substantially vertical pipe between said latter two ball and socket joints, said latter two ball and socket joints having their axes in substantial vertical alinement, the third ball and socket joint being located at the other end of the connecting device, a pipe substantially spanning the space between the engine and tender of the train and connecting the lower one of said two flexible ball and socket joints with the third ball and socket joint, said ball and socket joints free to move to automatically adjust the parts in response to relative movement between the engine and tender of the train, one section of each of the end ball and socket joints having a flange rigid therewith for rigidly connecting such sections with the engine and tender so as to hold the connecting device securely in position.

3. A connecting device between sections of a train, comprising three universal connections, two of said universal connections being located at the same end of the connecting device and being in substantial vertical alinement, the substantially vertical pipe connecting the two universal connections at the same end of the connecting device and a bent pipe connecting one of said latter connections with a third connection.

4. A connecting device between sections of a train, comprising three vertically suspended universal joints, two pipes connecting said joints, two of said joints located at one end of the connecting device, and the other joint located at the other end of the connecting device, whereby the joints are localized at the ends of the connecting device, the pipe connecting the two joints located at one end of the connecting device being directly connected to portions of said joints.

5. A connecting device between sections of a train, comprising three ball and socket joints, two of said joints being substantially in vertical alinement, a substantially vertically disposed pipe connecting them, a pipe connecting one of said latter joints with the third joint, said third joint being hung vertically, the two end joints being each provided with an attaching part having a substantially horizontal engaging face adapted to engage the train section and a plurality of separated fastening devices adapted to fasten said part to said train section.

6. A connecting device between sections of a train, comprising three flexible joints, each comprising a ball and ball inclosing part, the ball inclosing parts of two of said flexible joints being provided with flanges so that they can be directly rigidly attached to the two sections of the train, pipes connecting the ball portions of said two flexible joints with the third flexible joint.

7. A connecting device between the sections of a train, comprising three flexible joints, two of said joints comprising a ball and a flanged ball inclosing part, the ball inclosing parts of all of said joints being vertical, a substantially vertical pipe connecting two of said joints, a pipe connecting one of said latter joints with the third joint, the portion of said latter pipe being inclined, the flanged ball inclosing parts being directly rigidly connected with the train section.

In testimony whereof, I affix my signature in the presence of two witnesses this 9th day of February, 1915.

FRANCIS N. BARD.

Witnesses:
ELLA THIEME,
MINNIE M. LINDENAU.